United States Patent
Harpur et al.

(10) Patent No.: US 7,536,441 B1
(45) Date of Patent: May 19, 2009

(54) SYSTEM AND METHOD FOR MOTIVATING DELAYED RESPONSES TO MESSAGES

(75) Inventors: Liam Harpur, Dublin (IE); Patrick J. O'Sullivan, Dublin (IE); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/170,286

(22) Filed: Jul. 9, 2008

(51) Int. Cl.
*G06F 15/16* (2006.01)

(52) U.S. Cl. .................................. 709/206; 709/207

(58) Field of Classification Search ............... 709/203, 709/206–207, 232
See application file for complete search history.

(56) References Cited

U.S. PATENT DOCUMENTS

| | | |
|---|---|---|
| 4,225,918 A | 9/1980 | Beadle et al. |
| 4,376,982 A | 3/1983 | Bantz et al. |
| 4,418,333 A | 11/1983 | Schwarzbach et al. |
| 4,706,270 A | 11/1987 | Astegiano et al. |
| 4,835,731 A | 5/1989 | Nazarenko et al. |
| 4,918,690 A | 4/1990 | Markkula, Jr. et al. |
| 4,926,418 A | 5/1990 | Cidon et al. |
| 4,941,143 A | 7/1990 | Twitty et al. |
| 4,947,484 A | 8/1990 | Twitty et al. |
| 4,955,018 A | 9/1990 | Twitty et al. |
| 4,969,147 A | 11/1990 | Markkula, Jr. et al. |
| 5,018,138 A | 5/1991 | Twitty et al. |
| 5,020,132 A | 5/1991 | Nazarenk et al. |
| 5,049,873 A | 9/1991 | Robins et al. |
| 5,113,498 A | 5/1992 | Evan et al. |
| 5,128,930 A | 7/1992 | Nazarenko et al. |
| 5,212,724 A | 5/1993 | Nazarenko et al. |
| 5,396,613 A | 3/1995 | Hollaar |
| 5,412,660 A | 5/1995 | Chen et al. |
| 5,475,687 A | 12/1995 | Markkula, Jr. et al. |
| 5,560,029 A | 9/1996 | Papadopoulos et al. |
| 5,781,787 A | 7/1998 | Shafer et al. |
| 6,031,846 A | 2/2000 | Gurusami et al. |
| 6,058,389 A | 5/2000 | Chandra et al. |
| 6,175,859 B1 | 1/2001 | Mohler |
| 6,192,230 B1 | 2/2001 | van Bokhorst et al. |
| 6,370,112 B1 | 4/2002 | Voelker |
| 6,513,084 B1 | 1/2003 | Berkowitz et al. |

(Continued)

Primary Examiner—Jeffrey Pwu
Assistant Examiner—David Ampagoomian
(74) Attorney, Agent, or Firm—Locke Lord Bissell & Liddell, LLP; John E. Hoel

(57) ABSTRACT

A method is disclosed to provide delayed responses to messages. The method includes receiving in a computer, an email message containing a control character, from a network. The control character specifying a reply prohibiting period during which a reply to the email message over the network will be prohibited. The method then includes receiving in the computer, a user request at a requesting instant to reply to the email message. The method then includes determining whether the requesting instant occurs during the reply prohibiting period specified by the control character. The method then includes prohibiting a reply to the email message over the network if the requesting instant occurs during the reply prohibiting period. And finally, the method then includes allowing a reply to the email message over the network if the requesting instant does not occur during the reply prohibiting period.

1 Claim, 2 Drawing Sheets

U.S. PATENT DOCUMENTS

| | | |
|---|---|---|
| 6,529,932 B1 | 3/2003 | Dadiomov et al. |
| 6,546,014 B1 | 4/2003 | Kramer et al. |
| 6,968,361 B2 * | 11/2005 | Okamura .................... 709/206 |
| 7,149,893 B1 * | 12/2006 | Leonard et al. ............. 713/154 |
| 7,305,441 B2 | 12/2007 | Mathewson, II et al. |
| 2003/0233410 A1 | 12/2003 | Gusler et al. |
| 2005/0033845 A1 * | 2/2005 | Perepa et al. ............... 709/226 |
| 2005/0192098 A1 | 9/2005 | Guo et al. |
| 2005/0204008 A1 * | 9/2005 | Shinbrood .................. 709/206 |
| 2006/0285661 A1 | 12/2006 | Patel et al. |
| 2007/0124396 A1 | 5/2007 | Febonio et al. |
| 2008/0034043 A1 * | 2/2008 | Gandhi et al. ............... 709/206 |
| 2008/0168145 A1 * | 7/2008 | Wilson ....................... 709/206 |

* cited by examiner

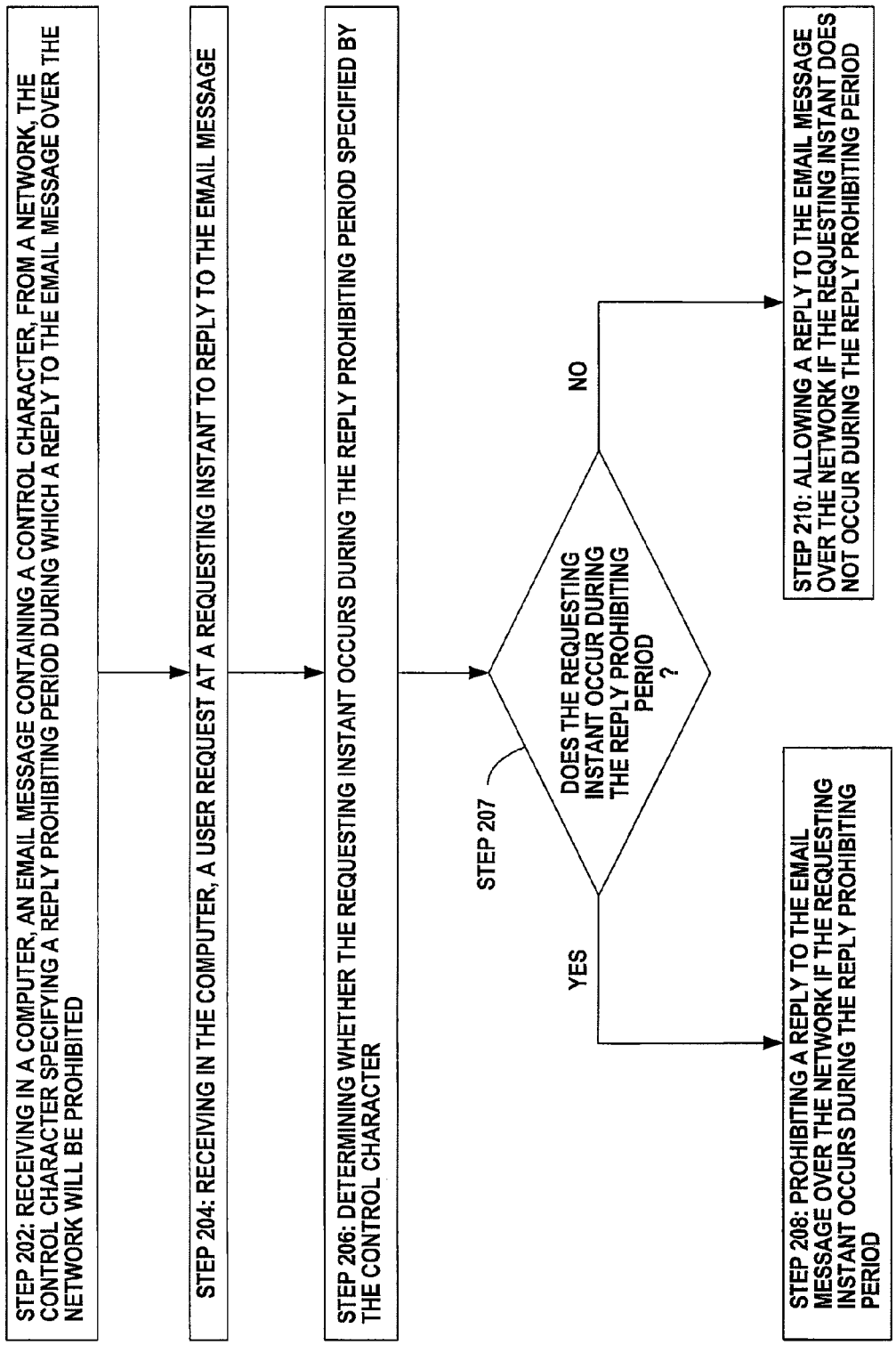

SYSTEM AND METHOD FOR MOTIVATING DELAYED RESPONSES TO MESSAGES

FIELD

The embodiments relate to email features.

BACKGROUND

In today's increasingly connected world, it is often hard to manage interruptions. For example, a busy manager may send an e-mail or instant message (IM) to an employee on Friday, but instead of receiving an unnecessary update over the weekend, he may only want an update on Monday. To alleviate this problem, a way is needed to better manage the interruptions caused by feedback to sent mails, i.e., to ensure that the response time preference of the sender is respected. There are no existing solutions that address this problem.

For exemplary purposes, two scenarios are provided that are illustrative of this issue. In one example, Pat, who is a senior manager of a large organization with many employees, already receives too many electronic messages. Pat would like to send a message to his team on Friday, but he wishes to receive responses only on Monday. Pat wants to keep his inbox relatively clear over the weekend because he needs to concentrate on other work. Unfortunately, if he wants to guarantee that no one will respond to him before Monday, he cannot send the e-mail on Friday. Using his current messaging system, there is no way for Pat to ensure that the specified message will not have a response before a certain time.

In another scenario, Barry is a project manager and is looking after a rather complex project. Barry sends an e-mail to a colleague about a forthcoming milestone, but he does not want a response until after the milestone is reached. Unfortunately, the recipients sometimes respond, making trawling through e-mails more time-consuming. Some recipients respond with ineffectual messages, such as, "OK—I will update you after the milestone," that clog up Barry's inbox. There is no way for Barry, using his current messaging system, to ensure that the specified message will not have a response before a certain time.

SUMMARY

A method is disclosed to provide delayed responses to messages. The method includes receiving in a computer, an email message containing a control character, from a network. The control character specifying a reply prohibiting period during which a reply to the email message over the network will be prohibited. The method then includes receiving in the computer, a user request at a requesting instant to reply to the email message. The method then includes determining whether the requesting instant occurs during the reply prohibiting period specified by the control character. The method then includes prohibiting a reply to the email message over the network if the requesting instant occurs during the reply prohibiting period. And finally, the method then includes allowing a reply to the email message over the network if the requesting instant does not occur during the reply prohibiting period.

The core contribution of knowledge is a system for messages, where the sender can specify, for example, "do not respond before x time and y date." For instance, a busy manager may send an e-mail or IM to an employee on Friday and may only want an update after the weekend. Rather than receiving unnecessary updates before then, the sender can specify when to get the next update in the message thread. Upon receipt of the message, the recipient may be explicitly informed of the preference/rule of the sender regarding the delayed response or, alternatively, the responding message may be delayed by the system after informing the recipient.

DESCRIPTION OF THE FIGURES

FIG. 2 is an example flow diagram of an example embodiment for the sequence of steps carried out by the program logic of FIG. 1.

DISCUSSION OF EXAMPLE EMBODIMENTS

Figure 1:
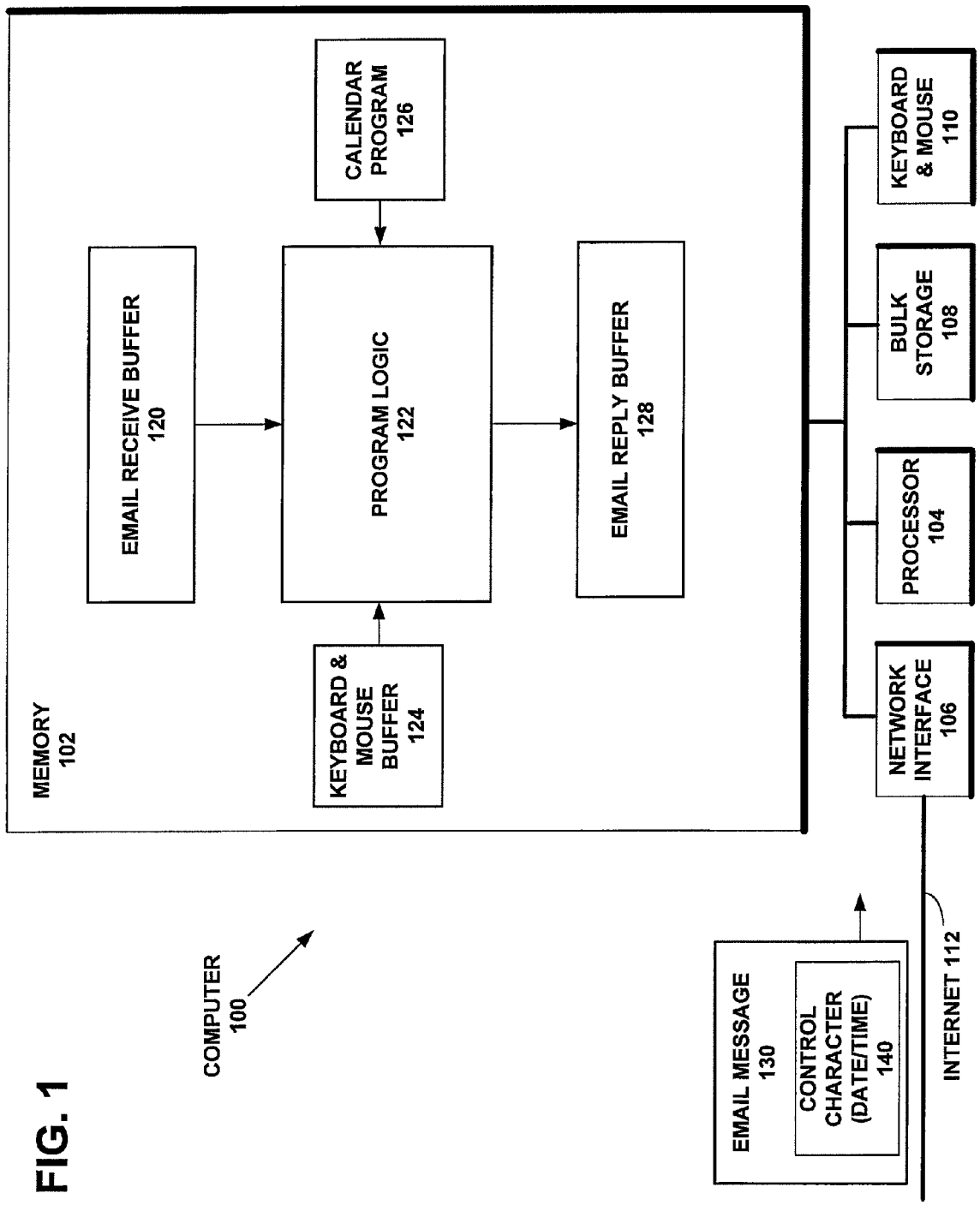
FIG. 1 is a functional block diagram of a computer system that performs motivating delayed responses to messages.

FIG. 1 is a functional block diagram of a computer system that performs motivating delayed responses to messages. A computer system 100 includes a memory 102, processor 104, network interface 106, bulk storage 108, and keyboard and mouse 110. The memory 102 includes an email receive buffer 120, program logic 122, keyboard and mouse buffer 124, calendar program 126, and email reply buffer 128. The program logic 122 connects to the keyboard and mouse buffer 124 and the calendar program 126. An email message 130 includes a control character (date/time) 140 that specifies the date and time before which a response cannot be sent. The email message 130 comes in over the Internet 112 or other network to the network interface 106.

The system and method provides delayed responses to messages. The method includes receiving in a computer 100, an email message 130 containing a control character 140, from a network. The control character 140 specifying a reply prohibiting period during which a reply to the email message 130 over the network will be prohibited. The method then includes receiving in the computer 100, a user request at a requesting instant to reply to the email message. The method then includes determining whether the requesting instant occurs during the reply prohibiting period specified by the control character 140. The method then includes prohibiting a reply to the email message over the network if the requesting instant occurs during the reply prohibiting period. And finally, the method then includes allowing a reply to the email message over the network if the requesting instant does not occur during the reply prohibiting period.

FIG. 2 is an example flow diagram of an example embodiment for the sequence of steps carried out by the program logic of FIG. 1.

Step 202 is receiving in a computer, an email message containing a control character, from a network, the control character specifying a reply prohibiting period during which a reply to the email message over the network will be prohibited.

Step 204 is receiving in the computer, a user request at a requesting instant to reply to the email message.

Step 206 is determining whether the requesting instant occurs during the reply prohibiting period specified by the control character.

Step 207 asks the question, does the requesting instant occur during the reply prohibiting period?

Step 208 is prohibiting a reply to the email message over the network if the requesting instant occurs during the reply prohibiting period.

Step 210 is allowing a reply to the email message over the network if the requesting instant does not occur during the reply prohibiting period.

In this manner, the method provides delayed responses to messages.

There are many implementations of this method. In a typical example, a user, when composing a message, may select the option "do not respond before x time and y date." The method to provide delayed responses to messages may be implemented using a centralized or client-side system by embedding code in the message. Alternatively, a server-side embodiment may manage the message on the server.

A user may configure this functionality in the messaging system to be enabled under certain circumstances, e.g., for all messages where the message is linked to a project plan entry in the future. Upon receiving the message, the recipient may explicitly get a message that the recipient cannot respond before x time and y date. Alternatively, when the recipient tries to respond, the recipient would get the same message. Additionally, the recipient may have an option to set a ToDo or follow-up at that time to respond to the message.

In one embodiment, the recipient of the message is prevented from "replying" or "forwarding" to the sender before the specified time.

In another embodiment, the recipient of the message can "reply" or "forward" to the sender, but the response is held in his mail client application until the specified time. Alternatively, the message may be held in the server of the mail client of the sender.

In another embodiment, the sender can give a "see responses" command to see replies or forwards independent of time. After the specified time, the replies or forwards are also in his in-box.

In another embodiment, the sent message is in a "do not copy" mode until the specified time. This mode helps prevent the composition of an early response (e.g., "I am working on it") that is not desired by the sender who is only looking for finished results. This mode, which is really a "do not respond," may allow some forwarding of the message to others but not a response to the original sender.

In another embodiment, the recipient of the original message may be prompted to respond. An e-mail, calendar, or IM indicator, which is at least partly dependent on the "specified time of response," may trigger him to respond. For example, the e-mail may change color or he may get an IM stating, "Response to an e-mail is now due".

In another embodiment, a recipient who makes an early response gets a message such as, "Your early response has been deleted. Please reply at the specified time with up-to-date information".

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments.

Although specific example embodiments have been disclosed, a person skilled in the art will understand that changes can be made to the specific example embodiments without departing from the spirit and scope of the invention.

What is claimed is:

1. A method, comprising:
   receiving in a computer, an email message containing a control character, from a network;
   said control character specifying a reply prohibiting period during which a reply to said email message over said network will be prohibited;
   receiving in said computer, a user request at a requesting instant to reply to said email message;
   determining whether said requesting instant occurs during said reply prohibiting period specified by said control character;
   prohibiting a reply to said email message over said network if said requesting instant occurs during said reply prohibiting period; and
   allowing a reply to said email message over said network if said requesting instant does not occur during said reply prohibiting period.

* * * * *